United States Patent Office.

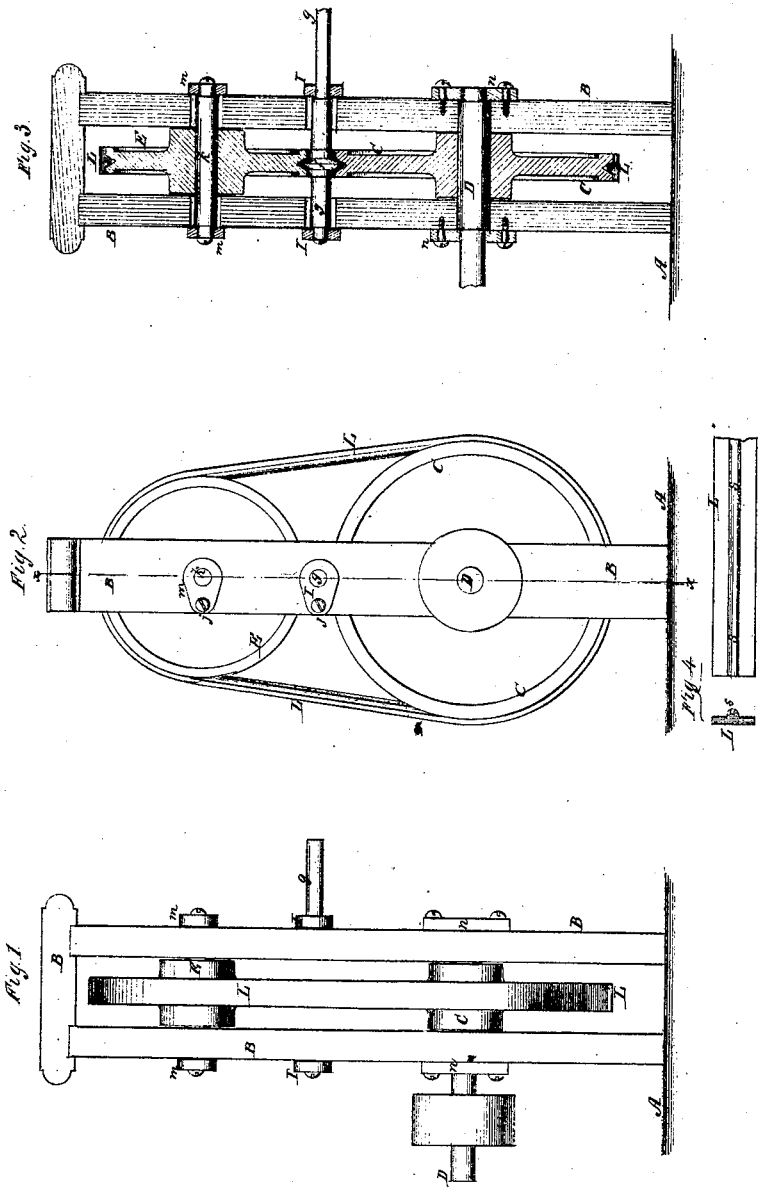

GEORGE B. HAMLIN, OF WILLIMANTIC, CONNECTICUT.

Letters Patent No. 101,872, dated April 12, 1870.

IMPROVEMENT IN DRIVING-GEARING.

The Schedule referred to in these Letters Patent and making part of the same.

*To all whom it may concern:*

Be it known that I, GEORGE B. HAMLIN, of Willimantic, of Windham county, in the State of Connecticut, have invented certain new and useful Improvements in Driving-Gearing or Driving-Mechanism for Machinery; and I do hereby declare that the following is a full and exact description thereof, reference being had to the accompanying drawings making part of this application.

My invention relates to that kind or system of driving-gearing, in which a series of driving-pulleys is employed in connection with a single driven pulley, the drivers being arranged around the driven pulley and belted together, so as to apply the motive power at opposite points on the driven pulley.

Previous to my invention it has been suggested to employ one or more driving-pulleys, arranged about a driven pulley, and belted together in such a manner that the driven shaft should be relieved of nearly all friction, and have the power distributed in its application at opposite points, as shown and described, for instance, in the Letters Patent granted to myself and George M. Rhoades, on the 16th day of March, 1869.

But in all the driving-gearing or arrangements of devices with which I am familiar, designed to work on this principle and to avoid friction and loss of power, there are certain obvious objections, which it is the main object of my invention to overcome.

In that kind or system of gearing to which my invention relates, there are certain advantages in the employment of grooved driving-pulleys, adapted to run with a round belt, and a driven pulley having a convex or V-shaped face to fit into said grooved drivers; in a mechanism so constructed the driven shaft is held endwise, without the use of any confining shoulders or other source of friction than that surface (the pulley faces) on which it is desired to create the necessary traction. But with this kind of (grooved) pulleys and belt the "slip" of the belt is much more liable, on account of its shape and the comparatively small surface afforded for the traction or hold of the belt in the pulley surfaces. Where plane or flat-faced pulleys are used, the hold of the belt is much better, but it is liable to run off, and advantages gained by the interlocking and increased traction of the pulley faces with each other are lost.

I propose by my invention to combine all the advantageous features of both systems heretofore practiced in one better than either of the others; and, to this end, My invention consists in the employment of driving-pulleys which are plane or straight (in cross-section) during a portion of the width of their faces, and having a groove or grooves formed therein, in connection with a driven pulley adapted to fit and run with said drivers, as will be hereinafter more fully described.

And my invention further consists in the employment of a driving belt having its friction surface adapted to drive both the flat and grooved portions of a pulley, having its face formed as herein set forth.

The third part of my invention relates to a novel method of arranging the bearings and boxes of the shafts, and consists in hanging the driven shaft and one or more of the driving-shafts in swinging stands, as hereinafter more fully described, for purposes set forth.

To enable those skilled in the art to make and use my invention, I will proceed to describe the several features of my improvements more fully, referring by letters to the accompanying drawings, in which—

Figure 1 is a front view;

Figure 2, a side elevation; and

Figure 3, a vertical section at $x\ x$, fig. 2.

Figure 4 is a detail view showing a portion of the belt detached, to illustrate its form more fully.

In the several figures the same part is designated by the same letter of reference.

A represents a suitable base or floor, from which is erected a frame, B, for the support of the driving mechanism or gearing, which consists of a main driving-pulley, C, to the shaft D, of which the motive power is applied, a secondary driving-pulley, E, and the driven pulley $f$.

The driven pulley $f$ is fast on the shaft $g$, which runs in suitable boxes or bearings in two swinging stands, I, and which shaft $g$ is supposed to carry the tool or machine to be operated.

The shaft $k$ of the secondary driver E is mounted in vibratory stands $m$, similar to those in which the shaft $g$ is hung.

The stands are all hung to the frame-work B by studs or pivots $j$, and the said frame is cut out sufficiently, as shown, to permit more or less motion or play to the shafts $g$ and $k$.

The main driving-shaft D is, of course, mounted in suitable bearings in stationary boxes or stands $n\ n$.

Over the pulleys C and E passes a belt, L, the peculiar form of which is clearly illustrated. It is plane or flat, as a common belt, on the outer face, but formed or provided with a central rib, $s$, or tongue on the face, which runs against the pulleys. This rib or tongue $s$ is adapted to fit into the grooves of the pulleys C and E, while the flat portion or surface each side of said rib runs against the flat portions of faces of the pulleys.

The belt should, of course, be put on tight, so as to draw and hold the faces of the pulleys C and E in perfect contact with the pulley $f$, which latter receives motion by friction from the former two.

The general operation needs but little explanation, as it is on the same principle as similar systems.

The motive power being applied through the medium of shaft D, the main driving-pulley C drives pulley E, by means of the belt L, and these two pulleys or wheels, C and E, through the medium of the friction of their peripheries on the periphery of pulley or wheel $f$, drive said wheel, and with it its shaft $g$. It will be understood that the driving power is applied through the contact of C and E with $f$, to opposite sides of pulley $f$, and in opposite directions, while the latter is held tight between the opposite faces of C and E, so that the shaft $g$ is relieved of all strain or friction in its bearings.

In order to carry out successfully this system of gearing or driving mechanism, it is necessary to have the shafts of pulleys E and $f$ hung so that they can freely move toward and from each other, and the simplest and best mode of construction to permit this is that shown in which the shafts are mounted in vibratory stands. The arc of the circle in which the shaft moves is so short, and the combination and arrangement of the parts of the mechanism are such, that this method is quite as practical, and works quite as well, as that in which sliding boxes are used, and it is much more economic of manufacture, and more durable, and less liable to derangement.

By the combination of the interlocking and flat or plain surfaces in the driving and driven pulleys, I am enabled to not only get a greater friction surface with a given sized pulley, and prevent an end motion, but am also enabled to apply a flat belting surface; while by the peculiarly-shaped belt shown, I am enabled to get the greatest degree of traction, and prevent any slip in the belt, and at the same time have the belt as little liable to run off as a round belt running in grooved pulleys.

It will be understood, of course, that my invention may be applied and practiced under a variety of modifications, in different kinds of machinery, and that the number of pulleys, size, and proportions, and the relations of grooves and flat surfaces, may be varied, without departing from the spirit of my invention.

Having fully explained my invention, so that those skilled in the art can make and use the same,

What I claim therein as new, and desire to secure by Letters Patent, is—

The employment, in combination with a pulley to be driven by them and adapted to fit to the peripheries thereof, of two or more driving-pulleys, the faces of which are partially plane or flat, in cross-section, and partially grooved, substantially as and for the purposes herein set forth.

Also, the use of a driving-belt, the friction surface of which consists of a plane, having one or more ribs or tongues, substantially as described, for the purposes set forth.

Also, the employment, in combination with the stationary pulley and shaft and the movable pulleys and shafts, of swinging stands I and $m$, as and for the purposes specified.

In testimony whereof I have hereunto set my hand and seal this 28th day of February, 1870.

GEORGE B. HAMLIN. [L. S.]

Witnesses:
A. O. GALLUP,
WILLIAM R. PATTEN.